United States Patent
Engelke et al.

(10) Patent No.: US 6,549,611 B2
(45) Date of Patent: *Apr. 15, 2003

(54) TEXT ENHANCED TELEPHONY

(75) Inventors: Robert M. Engelke, Madison, WI (US); Kevin Colwell, Middleton, WI (US)

(73) Assignee: Ultratec, Inc., Madison, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/977,842

(22) Filed: Oct. 15, 2001

(65) Prior Publication Data

US 2002/0064256 A1 May 30, 2002

Related U.S. Application Data

(63) Continuation of application No. 09/572,819, filed on May 17, 2000, now Pat. No. 6,307,921, which is a continuation of application No. 09/034,076, filed on Mar. 3, 1998, now Pat. No. 6,075,842, which is a continuation-in-part of application No. 07/842,943, filed on Jan. 9, 1992, now Pat. No. 5,351,288, which is a continuation-in-part of application No. 07/616,720, filed on Nov. 6, 1990, now Pat. No. 5,081,673, which is a continuation of application No. 07/255,357, filed on Oct. 11, 1988, now abandoned, application No. 09/977,842, and a continuation-in-part of application No. 08/155,061, filed on Nov. 19, 1993, now Pat. No. 5,517,548, and a continuation-in-part of application No. 08/129,894, filed on Sep. 30, 1993, now Pat. No. 5,432,837, which is a continuation-in-part of application No. 07/886,552, filed on May 20, 1992, now abandoned, said application No. 08/155,061, and a continuation-in-part of application No. 07/886,552.

(51) Int. Cl.$^7$ ............................................. H04M 11/00
(52) U.S. Cl. ........................................ 379/52; 379/93.17
(58) Field of Search ................................ 379/52, 88.14, 379/93.15, 93.17, 93.09; 704/2, 231, 270, 270.1, 271, 277

(56) References Cited

U.S. PATENT DOCUMENTS

| | | | | |
|---|---|---|---|---|
| 5,289,523 | A | * 2/1994 | Vasile et al. | 379/52 |
| 5,724,405 | A | * 3/1998 | Engelke et al. | 379/52 |
| 6,075,842 | A | * 6/2000 | Engelke et al. | 379/52 |
| 6,307,921 | B1 | * 10/2001 | Engelke et al. | 379/52 |

* cited by examiner

*Primary Examiner*—Stella Woo
(74) *Attorney, Agent, or Firm*—Quarles & Brady LLP

(57) ABSTRACT

A system is described for assisting the hard of hearing in the use of the telephone, the system termed here text enhanced telephony or TET. The hard of hearing user uses a TET device or appliance which permits the user to speak and to hear the words spoken by the other party, the TET device also supplying to the user a text character stream of the words spoken by the other party. The TET system uses the system of voice-to-text relays, already in existence to assist the deaf community communicate with hearing persons over the telephone, to translate the spoken voice into a text stream. The TET relay and TET device are capable of separating voice and digital communications frequencies carrying text so that voice and a text communications stream of the words spoken by the voice can be carried over a common telephone line. The devices can also be capable of automated capabilities such that the devices can automatically configure a three-party relay call without the need for the user's instructions.

1 Claim, 10 Drawing Sheets

TEXT ENHANCED TELEPHONY

CROSS-REFERENCE TO RELATED APPLICATIONS

This application is a continuation of U.S. patent application Ser. No. 09/572,819 filed May 17, 2000, now U.S. Pat. No. 6,307,921, which is a continuation of U.S. patent application Ser. No. 09/034,076 filed Mar. 3, 1998, now U.S. Pat. No. 6,075,842, which is a continuation-in-part of Ser. No. 07/842,943 filed Jan. 9, 1992, now U.S. Pat. No. 5,351,288 which was a continuation part of Ser. No. 07/616,720 filed Nov. 16, 1990, now U.S. Pat. No. 5,081,673, which was a continuation of Ser. No. 07/255,357 filed Oct. 11, 1988 now abandoned. This application is also a continuation-in-part of Ser. No. 08/129,894 filed Sep. 30 1993 now U.S. Pat. No. 5,432,837 and of Ser. No. 08/155,061 filed Nov. 19, 1993 now U.S. Pat. No. 5,517,548, both of which are continuations-in-part of Ser. No. 07/886,552 filed May 20, 1992 now abandoned.

STATEMENT REGARDING FEDERALLY SPONSORED RESEARCH OR DEVELOPMENT

Not applicable.

BACKGROUND OF THE INVENTION

The present invention relates to telephone communication in general and relates in particular, to assisted telephone communication for persons having attenuated hearing capability.

Much of modern personal communication, both in social and business environments, takes place through the telephone. Yet, there are many persons in society who have attenuated hearing capability and are thus disabled or incapable or handicapped in using the voice telephone system commonly in use today. For person who are deaf, there has for some time been a system of communication through the telephone system which has been used by the deaf community. That system makes use of devices known as telecommunication devices for the deaf (TDDs), also known as text telephones (TTYs). Current TDDs are electronic devices consisting of a keyboard and a display and a modem, to acoustically or directly couple to a telephone line, which permit the user to type characters into their keyboard, with the characters then be encoded and transmitted over the telephone line to be displayed on the display of a communicating or remote TDD.

Current TDD communication is conducted in a code, known as Baudot or Baudot/Weitbrecht, which evolved historically at a time when many telecommunication devices for the deaf were based on mechanical or electromechanical devices rather than the current generation of electronic devices. Accordingly, the Baudot protocol was constructed for a set of constraints which are no longer relevant to present day devices. The original Baudot protocol was a uni-directional, or simplex, system of communication conducted at 45.5 baud. The normal Baudot character set consists of a 5 bit characters, and the system is a bi-tonal system based on 1400 and 1800 hertz tones. The protocol does not utilize a carrier when no signals are being sent, and because of the protocol for character transmission, which includes a start bit and at least 1½ stop bits, it is only possible to send approximately 6 characters per second, one way, during conventional Baudot communications.

In spite of its limitations, the Baudot communication system, and TDDs, are widely used within the community of persons who are deaf. In addition, systems have been implemented to permit users of the TDD system to communication with hearing people. This is done through the use of a so-called "relay." A relay, as used herein, refers to a system of voice to TDD communication which uses an operator referred to as a call assistant who serves as an intermediate between a hearing user on one telephone line and a deaf TDD user on a second telephone line. The call assistant wears a headset to communicate by voice with the hearing user and also has access to a TDD so that the call assistant can communicate with the deaf user via the TDD. Thus, the call assistant serves as an intermediary between the deaf person and the hearing person so as to, in effect, translate from voice to digital electronic forms of communication.

While the TDD communication system has a constituency within the deaf community, it is not widely used by persons who are deficient in hearing capability, but would not describe themselves as deaf. Many otherwise fully able persons, particularly elderly ones, suffer attenuated hearing capability due to aging, disease, or other traumatic condition. Many persons who have some degree of hearing capability left do not consider themselves "deaf," and therefore will tend not to avail themselves of specialized equipment intended for the deaf community. If a person has spent much of his or her life engaged in oral communication using the spoken word in the telephone, it is difficult to accept that telephonic communication may become difficult or impractical as one's hearing declines in efficiency. No system has heretofore existed which is capable of assisting the person who has significant hearing loss, in communication over the telephone in a manner which emulates, to the fullest extent possible, the normal telephonic communication patterns of hearing people.

BRIEF SUMMARY OF THE INVENTION

The present invention is summarized in that a text enhanced telephonic device is made available to persons who have a hearing loss. The text enhanced telephone will, to the user, operate like a normal telephone but will, in addition to receiving normal voice communication, permit the user to receive the words spoken by the remote party in a visual format on a visual display located on the text enhanced telephone which the user is operating.

It is an object of the present invention to provide a text enhanced telephone which may be operated by a user who is hearing deficient in a manner like all conventional telephones, but with the added capability that received communications are displayed in text so that the user can read the communications to supplement any words which are not understood verbally.

It is a feature of the present invention that the operation of the text enhanced telephone can be made transparent to the user so that little or no retraining or otherwise adaptive behavior needs to be taught to the user of the system.

Other objects, advantages, and features of the present invention will become apparent from the following specification when taken in conjunction with the accompanying drawings.

DETAILED DESCRIPTION OF THE INVENTION

The present invention envisions a new class of telephone communications equipment, here termed text enhanced telephones or TETs. These TET devices are intended to assist the hard of hearing person in the use of a telephone to communicate with others in a normal fashion. The text enhanced telephone device can be packaged in any of several ways. The device can be, for example, any of (i) an intermediate appliance plugged in between the handset and the telephone base, (ii) an intermediate appliance plugged in between the telephone and the wall jack or (iii) a unitary device built into the telephone itself. Whichever physical form it takes, the TET device includes a visual display onto which text characters may be displayed. The user of the TET uses the device as they would a normal telephone. The difference is that for a TET, in addition to the remote persons' spoken voice being heard over the telephone speaker or earpiece, the words spoken by the remote user appear in written text form on the visual display, where they can be read by the person with hearing difficulty. Thus, to the person who is hearing impaired, the use of the TET device is "normal," and in accord with their usual habit, and the person gains the benefit of any non-verbal spoken cues, such as inflection, volume, pauses, or the like, that the user can hear, as well as receiving in a text character stream all of the words actually spoken by the other person.

The functioning of such a device will preferably be based on an enhanced TDD protocol, such as the one which will be disclosed below. It is to be understood, however, that TET can also be implemented in devices operating in conventional Baudot or other digital text data protocol, such as ASCII or CCITT. A TET device may also employ the existing relay system to serve as the communication link to convert oral to text communication, also as will be described below. Thus the specification below will begin with a schematic of the prototypical TET device, followed by a description of the preferred code system, a description of relay operation in general, and then a description of several of the variants of TET design which may be utilized within the system of the present invention.

The Text Enhanced Telephone

Figure 1:
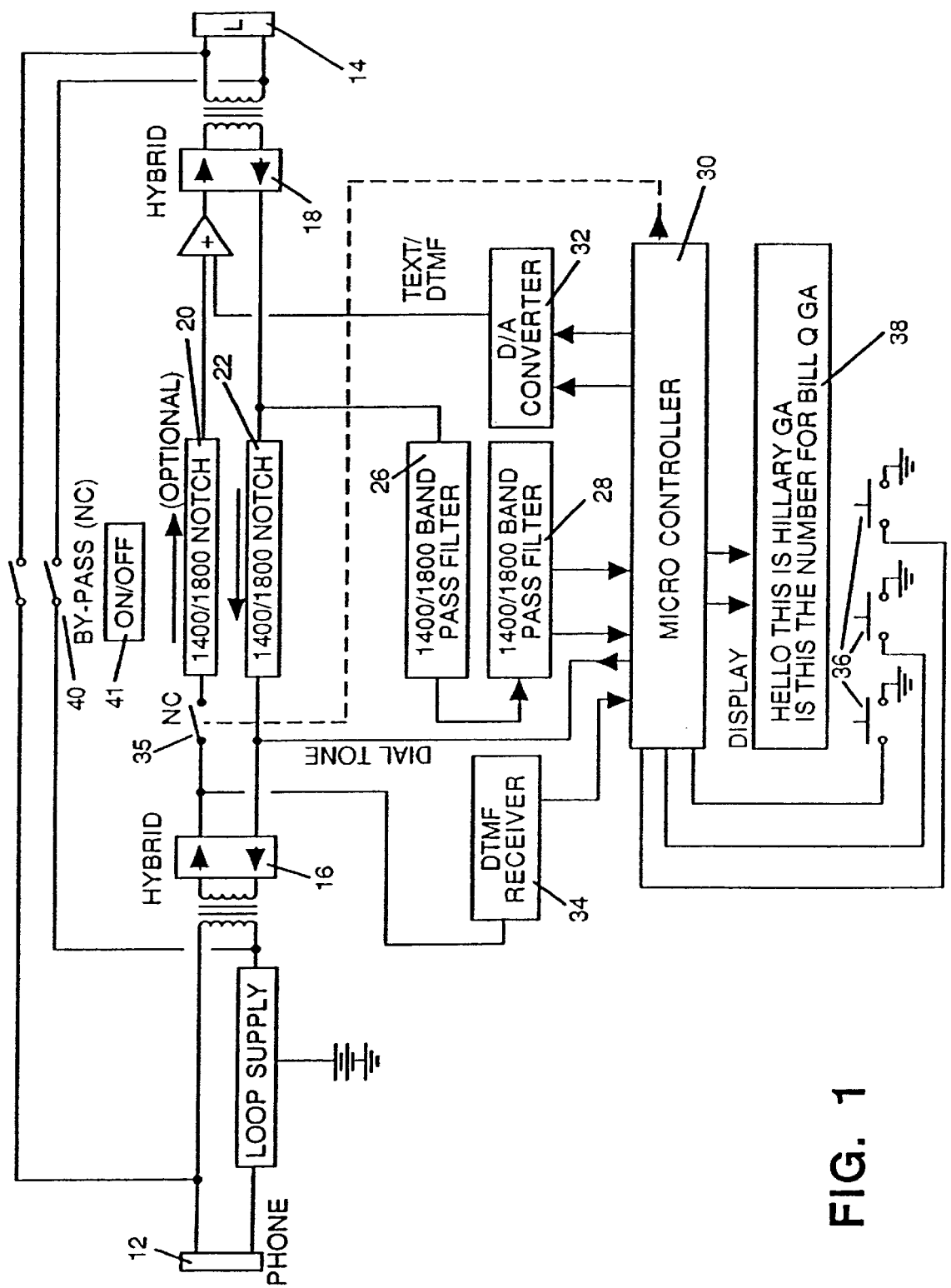
FIG. 1 is a schematic circuit diagram of one embodiment of a text enhanced telephone (TET) constructed in accordance with the present invention.

Shown in the schematic illustration of FIG. 1 is the circuitry of one embodiment of a version of a text enhanced telephone (TET) operated in accordance with the present invention. The TET device of FIG. 1 is a device intended to be inserted in series in between the base unit of a conventional telephone and the wall jack into which the telephone is connected. Therefore, at its input, and its output, the TET of FIG. 1 is configured to have conventional analog telephone connectors or jacks. Indicated at 12 is the jack which would be connected to the telephone, and indicated at 14 is the jack which would be connected to the telephone wall jack. Connected to each of the respective input and output jacks 12 and 14 is a device referred to in the telephone industry as a hybrid or a two-wire to four-wire converter, the two hybrids being labeled 16 and 18 respectively. These hybrids, conventional in the telephone and data communications industry, serve to either separate or combine the transmitted and received analog telephone signals or, as their other name implies, separate the two-wire telephone signal into four wires. On the transmit line, which is created from the hybrid 16, the line is connected next to a notch filter 20. The notch filter 20, of conventional design in the art, is specifically intended to pass signals of all frequencies, except those at the digital text communication frequencies, which are 1400 and 1800 hertz for the enhanced TDD protocol described below. The output of the notch filter 20 is connected through an analog summer 24 to the input side of the hybrid 18. The output side of the hybrid 18 is connected as an input to a notch filter 22, which is similar in design to the notch filter 20, and also constructed to provide filtering of signals at 1400 and 1800 hertz. The output of the notch filter 22 goes as the input to the hybrid 16.

Also connected to the same line that goes to the input of the notch filter 22 is a band pass filter 26. The band pass filter 26, also of a design conventional within the art, is the converse of the notch filters 20 and 22. The band pass filter 26 is intended to pass only signals at 1400 and 1800 hertz. The output of the band pass filter 26 is connected to a tone detect circuitry 28, or receive modem as they are also termed, of a type conventionally used in TDD devices. The tone detect circuitry 28 detects either 1400 or 1800 hertz, and provides an appropriate digital output to a microcontroller 30. The microcontroller 30 includes a microprocessor and appropriate ROM and RAM memory. Code stored in the ROM directs the operation of the microprocessor. On the output side of the microcontroller 30 is a digital to analog converter 32, the output of which is connected as the other input to the analog summer 24. A DTMF decode circuit, indicated at 34, is connected to the output line from the hybrid 16, and is the type of device intended to decode the dual tone multifrequency, or "Touch Tone," (Trademark) signals from a push button telephone. The output of the DTMF decode circuit 34 is also connected as an input to the microcontroller 30. The microcontroller 30 also operates a normally closed switch, or relay, 35 located between the hybrid 16 and the notch filter 20 after the connection to the DTMF receiver 34. A series of user accessible switches 36 are also connected as inputs to the microcontroller 30. The microcontroller 30 is also connected to a visual display 38 which is capable of providing an alpha-numeric display of text characters presented to it by the microcontroller 30. Separately, a bypass circuit, designated at 40, and controlled by an on/off switch 41, is connected between the input and output telephone jacks 12 and 14 directly and which, when actuated, is capable of bypassing the entire internal components of the device of FIG. 1.

The operation of the device will be described briefly here, and then in more detail below. The purpose of the TET device, when enabled, is to intercept the outgoing call placed by the user, as detected by the DTMF decode circuit. The microcontroller 30, during the dial by the user, intercepts the dialed tones and does not present them on the output line by opening the switch 35. When the user has finished dialing the number, the microcontroller 30 utilizes its analog capabilities, accessed through the D to A converter 32, to present on the output line the DTMF signal for a telephone number, but not the telephone number dialed by the user. Instead, the microcontroller 30 dials the number of the TET relay which the user normally utilizes. As the TET device makes initial contact with the relay, the TET device passes to the relay a series of machine command codes. The operation of such command codes will be described below. The function of the command codes at this point is to inform the relay as to the type of call to be implemented, and then to pass to the relay the number for the ultimate hearing person to be connected. The relay equipment will then automatically dial the number of the hearing user and configure a TET relay with a call assistant in the loop between the TET device, operated by the TET user, and the hearing user at the other end of the line.

When the set-up is completed, the hearing user speaks and the call assistant types the words spoken by the hearing user into the TDD at the relay. The telephone line between the TET and the relay will carry both the spoken words of the hearing user and the digital signals for the text typed into the device used by the relay call assistant. In the TET device of FIG. 1, the purpose of the notch filter 22 is to keep the text communication tones from being heard by the TET user. At the same time, the purpose of the notch filter 20 is to prevent the words spoken by the TET user from inadvertently interfering with the transmission and receipt of the digital communication tones. While the communication session is on-going, the TDD tones are passed through the band pass filter 26 and detected and decoded by the microcontroller 30. The microcontroller 30 decodes the digital text, and then presents a text character stream of the words spoken by the remote party on the visual display 38 so it can be read by the user. Thus the user, without having to take specific action, has created a call in which he or she may speak normally to the person at the other end of the line, and the person at the other end of the line may also speak normally. The hard of hearing or deaf user does not hear any of the digital communication tones for the text, but sees at his or her TET device a visual text character stream of the words spoken by the user at the other end of the line, in a real time fashion.

These advantages to the user, and the intimate functioning of the device of FIG. 1, can best be understood by understanding some additional technical details of the device which will be described below.

TET Relay

As relays for the TDD community are presently constituted, the relay serves as a translator between Baudot or TDD users and users who can speak and hear. The person employed at the relay, referred to as a call assistant, sits at a TDD terminal and wears a headset connected as a regular voice telephone. Using the TDD operated by the call assistant, the call assistant communicates in a digital code over one telephone line to the TDD user, preferably using an enhanced TDD protocol. Using the headset, the call assistant communicates over the second telephone line in normal voice with the speaking and hearing party. In this way, the deaf person is facilitated in communicating with hearing persons over the telephone. Such relays are now maintained by local or regional telephone exchanges all over the United States, and in other countries, and are specifically intended to allow access to the telephone communication system for users who have difficulty hearing or who cannot hear.

Figure 2:
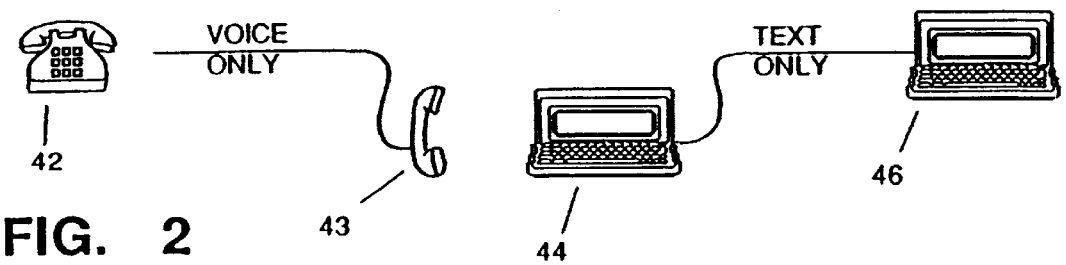
FIG. 2 is a schematic illustration of the operation of a conventional TDD relay.
Figure 3:
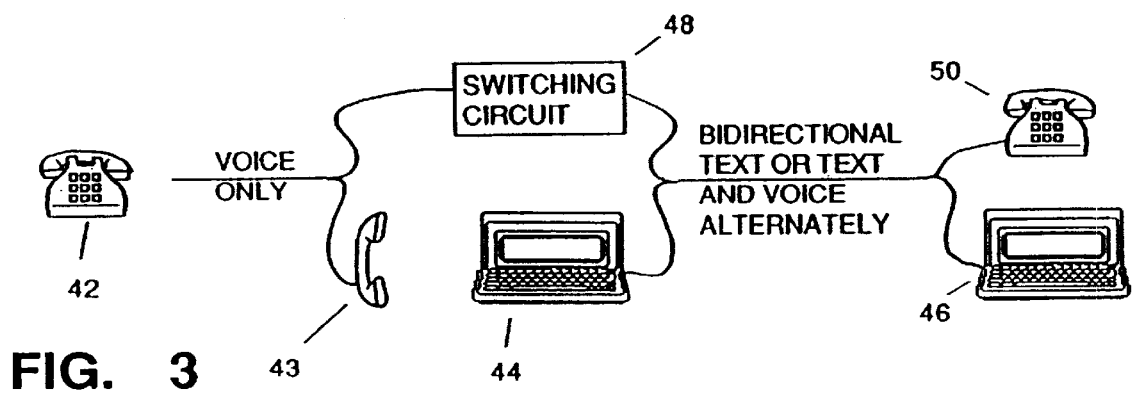
FIG. 3 is a schematic illustration of the operation of a TDD relay with voice carry-over.
Figure 4:
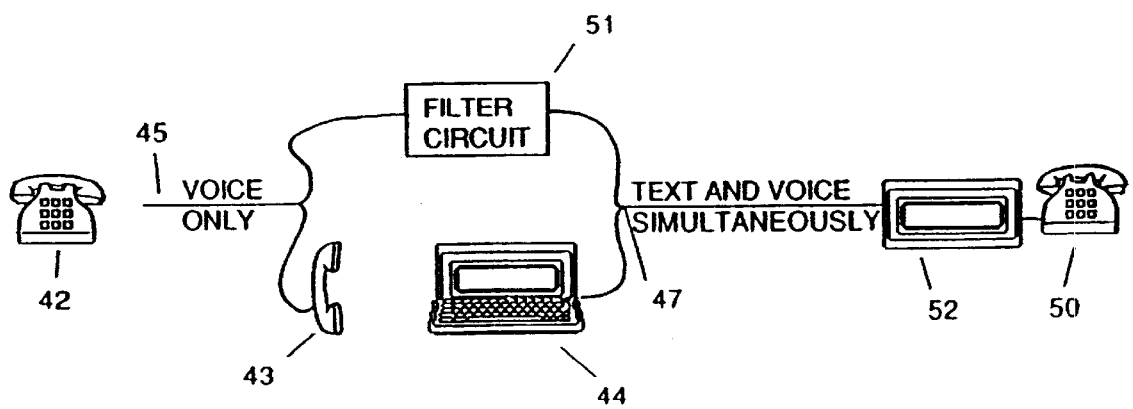
FIG. 4 is a schematic illustration of the operation of a text enhanced telephone (TET) relay system.

One enhancement that has already been built into some relays is intended to provide better telephone access to users who can speak but not hear. Such persons may still use a relay, but use it in a mode known as "voice bridge" or "voice carry-over" (VCO), where the voice of the deaf or hard of hearing user is transmitted through the relay to the hearing user. Such a voice bridge relay system is discussed and disclosed in more detail in U.S. Pat. No. 5,081,673, the disclosure of which is hereby incorporated by reference. Shown in FIGS. 2, 3 and 4 are schematically the different arrangements of relay usage for normal relay, voice bridge relay, and text enhanced telephony relay respectively. In each of FIGS. 2, 3, and 4, the hearing and speaking user is at the telephone 42.

The telephone 42 of the hearing and speaking user is connected in FIG. 2 to the handset (or headset) 43 of the call assistant who uses a TDD 44 to communicate with the TDD 46 of the deaf or hard of hearing person.

In FIG. 3, the voice bridge, a switching circuit 48 connects the telephone line from the telephone 42 to a telephone 50 accessed by the deaf or hard of hearing user. The switching-circuit 48, such as that described in the above U.S. Pat. No. 5,081,673, connects the two telephones 42 and 50 such that when voice is on the line and opens the circuit when TDD signals are on the line, as when either of the TDDs 44 or 46 are operated. Thus, the variant of FIG. 3 permits text or voice on the same line, between the relay and the disabled user, alternately, but does not permit simultaneous transmission of text and voice. Also, since the telephone line between the relay and the telephone 50 is switched to text transmissions when the user at telephone 42 is speaking, voice is never received at the telephone 50.

Illustrated in FIG. 4 is the general scheme for the typical relay implementing TET. The telephone 42 of the hearing user is connected by a first telephone line 45 to the handset 43 of the call assistant. The call assistant types at the TDD 44, placing data communications on a second telephone line between the relay and the hard of hearing user who is at the telephone 50. A TET appliance 52 is also placed in series with the telephone 50. A filter circuit 51 connects the telephone line 45 from the hearing user's telephone 43 to the telephone line 47. The filter circuit 51 is constructed such that all voice communications, but no data signals from text, pass through the filter circuit 51, so that the hearing user does not hear the communication tones of the text transmissions. At the station of the deaf or hard of hearing user, the TET appliance 52 receives the text communications from the TDD 44 and displays the received text characters for the user. At the same time, the TET device 52 filters from the telephone line 47 the text communications signals so that the user on telephone 50 only hears the voice communications. Thus the users of the two telephones 42 and 50 converse normally, with the communication to the user of the telephone 50 assisted by the display of the text of what is said by the other user onto the visual display of the TET appliance 52.

Figure 5:
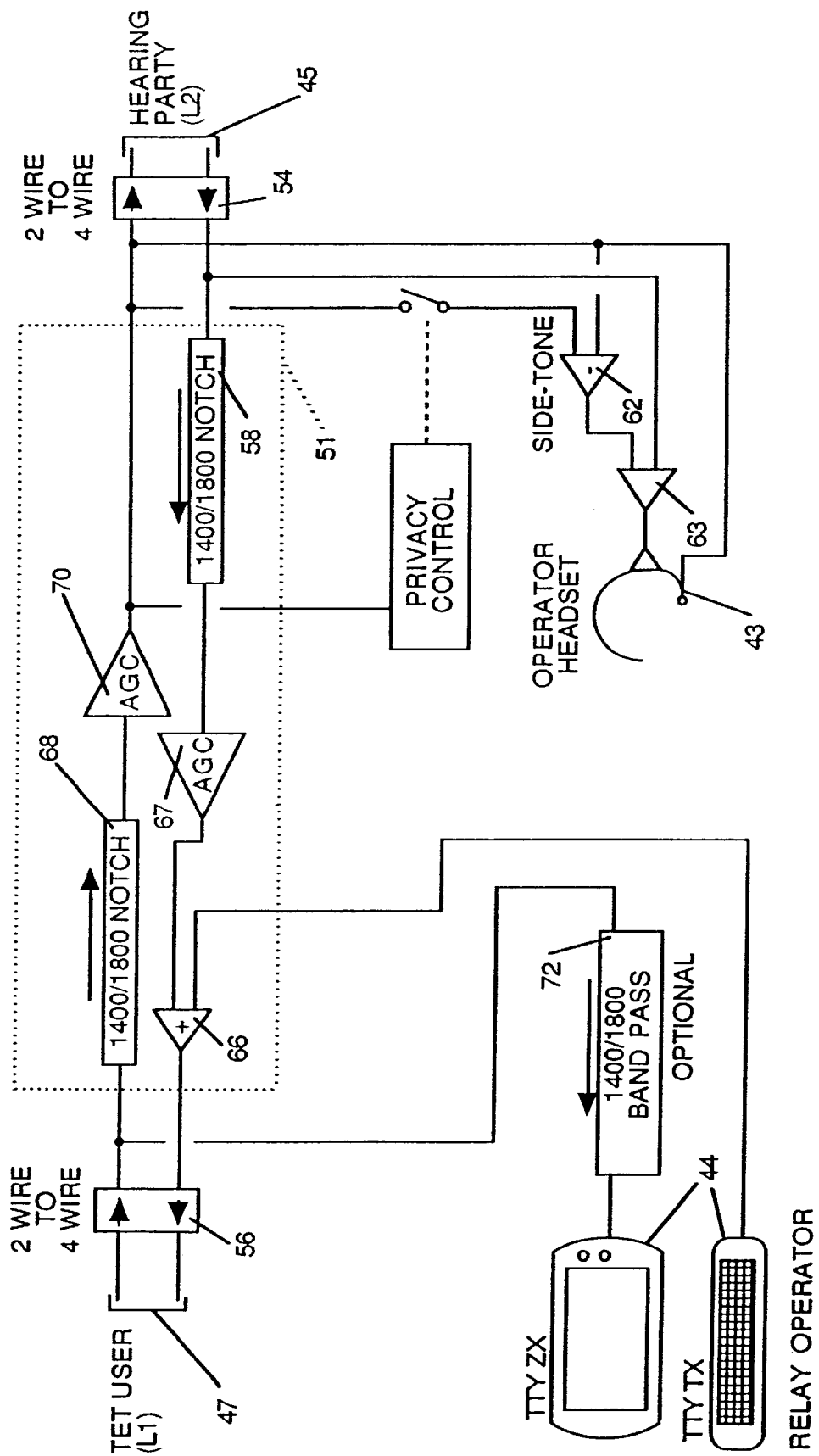
FIG. 5 is a circuit diagram of a TET relay for use in the system of FIG. 4.

Thus, to implement the present invention, some modifications must be made to the configuration of the relay. A schematic diagram showing such a modified relay for TET operation is shown in FIG. 5. In FIG. 5 reference numerals are similar to FIG. 4 for similar parts, such as the call assistant's headset 43, the TDD 44 of the call assistant and the filter circuit 51, shown here in more detail. At each of its ends, the relay of FIG. 5 includes hybrids 54 and 56 to separate the single telephone line carrying communications in each direction into separate lines for each direction. A notch filter 58 is connected to the hearing user's telephone line 45. The notch filter 58 is, again, constructed so as to pass through signals of all frequencies, except for signals at the text communications frequencies, preferably the 1400 and 1800 hertz tones of enhanced TDD protocol. Also connected to the input line is a amplifier 63, connected to supply voice from the hearing user to the headset 43 of the call assistant. A side-tone amplifier 62 is connected to feed attenuated voice of the call assistant back to the call assistant for normal voice feedback purposes. The output of the notch filter 58 passes through AGC amplifier 64 and an analog summer 66 to be connected to the telephone line 47 to the TET user.

The telephone line 47 from the TET user, connected through the hybrid 56, is passed through a notch filter 68, then through an AGC amplifier 70 to the telephone line 45 to the hearing user. Also optionally connected to the telephone line 47 from the TET user is a band pass filter 72, constructed so as to pass only the digital communication frequencies. The output of the band pass filter goes to the TDD 44, while the output of the TDD 44 is connected through the analog summer 66 to the TET user's telephone line 47.

The circuit of FIG. 5 thus permits both voice and text to be carried simultaneously on the telephone line 47 between the TET relay and the TET user. The text communication frequencies are filtered out by the notch filter 68, so that the hearing user and the call assistant will not hear the text communication tones. Meanwhile, voice signals pass through the relay in both directions.

The purpose of the notch filter 58 in the circuit of FIG. 5 is to minimize voice interference with accurate text communications. Since normal human voice may contain frequency components at 1400 and 1800 hertz, the voice signal could garble the text communications between the call assistant and the TET user. By using a narrow notch filter, little or no voice content is perceived to be lost while the accuracy of text transmission is maintained. If some garbling of text is acceptable, it may be possible in some applications to omit the notch filter 58. Similarly, the band pass filter 72, inserted to assure the integrity of text communications, if desired, to the call assistant, can be omitted if no such transmissions are to be conducted.

Certain optional functions of the TET device, when used in conjunction with the TET relay, are made possible by the use of the enhanced TDD protocol and machine control codes. Thus these protocols will be described next.

Enhanced TDD Protocol

To make use of the present invention, a code system is required which permits the transmission of text communications efficiently and quickly. The preferred system for use in the present invention is an enhanced TDD protocol, specifically designed to be backwardly compatible with the installed base of Baudot TDD communication terminals. The enhanced TDD protocol is based on frequency shift keying encoding an average, though variable, transmission rate of just over 100 BAUD. The signals for a logical 1 and logical 0 in the enhanced TDD protocol are just as they are in standard Baudot, i.e. 1400 hertz for a mark and 1800 hertz for a space. However, the enhanced TDD protocol is unusual in that, for reasons having to do with the electronics associated with TDD tone recognition circuitry, the time for a space bit and the time for a mark bit are defined to be different. The space bit is defined to be 12 milliseconds, while the mark bit is defined to be 7 milliseconds. Moreover, the enhanced TDD protocol character set consists of a 7 bit 128 character table, such as the ASCII or CCITT character table, rather than the conventional 32 or 64 character table used by conventional Baudot communications. This permits the enhanced TDD protocol to use upper and lower case letters, as well as leaving extra characters available for machine control functions. The enhanced TDD character data signal consists of a start bit, the 7 character bits, no parity bit, and 2 stop bits. The start bit is a space and the stop bits are both marks.

The enhanced TDD protocol, like conventional Baudot protocol, operates in a simplex mode, in which only one of the two terminals communicating can be transmitting at any one time. However, the details of operation of the enhanced TDD protocol result in a pseudo-duplex capability. The pseudo-duplex capability arises because each of the enhanced TDD protocol terminals is constrained by virtue of its programming to operate in accordance with two rules. The first rule is that each terminal is constrained not to make any transmissions outward on its communication line while it is receiving data. During the time period that the terminal is receiving data, characters entered from the keyboard are not transmitted, but are stored in a buffer. The enhanced TDD protocol terminal will wait until there is a pause in the communication line before transmitting characters from its buffer in turn toward the other station. The second rule of pseudo-duplex communication requires that the enhanced TDD terminal pause after a certain N number of characters have been transmitted. The number of characters N is between 1 and 72, and preferably between 1 and 20. Thus, only one station is transmitting at a time, and the other station listens and buffers characters until the first station pauses, at which time it begins transmission of characters. The effect of the operation of these two rules, together with the higher speed of transmission achieved by communication at over 100 Baud, causes the communication between the two stations to appear duplex to the users, even though on an electrical signal level, communication is simplex. It is for this reason that this style of communication is referred to as pseudo-duplex.

Figure 6:
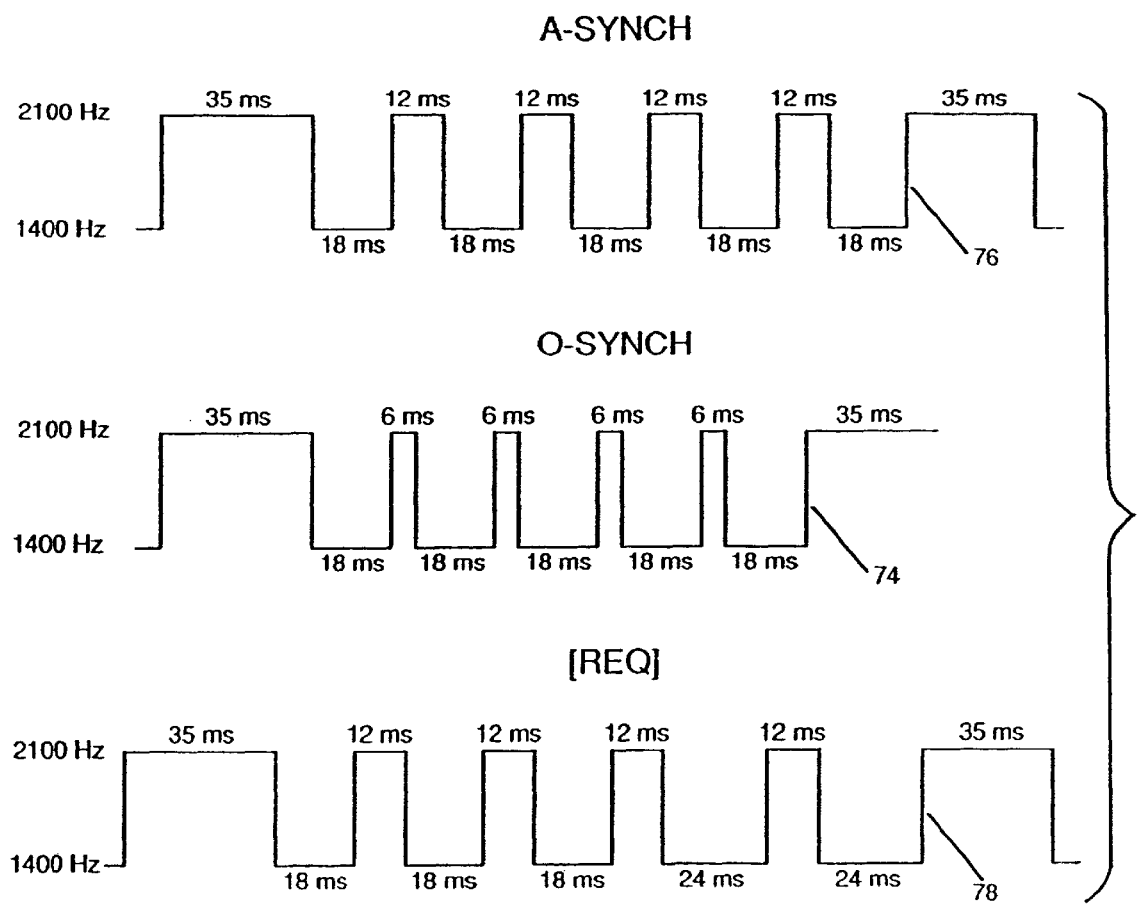
FIG. 6 is a timing diagram of synchronization sequences for use in an enhanced TDD protocol useful in the present invention.

In addition to the other differences from conventional Baudot communication, the enhanced TDD protocol requires a recognition or handshake protocol in which the two stations must establish that they are both capable of enhanced TDD protocol communication before switching from conventional Baudot communications to the enhanced TDD protocol. Accordingly, the enhanced TDD protocol preferably includes a series of synch-originate characters and synch-answer characters, which are defined not to be printing characters, which the stations may transmit to each other to identify themselves to each other and to switch into enhanced TDD protocol communication. The synchronization characters also have non-standard bit times so they can be distinguished from displayable characters. To originate communications, an originating special synchronization character, referred to as the "O-synch" sequence is transmitted by the calling station. If the called enhanced TDD device receives and recognizes the O-synch sequence, and is capable of enhanced TDD communication, then it transmits an "A-synch," or answer synchronization sequence, to the originating station. FIG. 6 illustrates an exemplary O-synch sequence at 74 and an exemplary A-synch sequence at 76. After recognizing the transmission and receipt of these signals both machines can then communicate in the enhanced TDD protocol. If the enhanced TDD terminal fails to receive proper synchronization sequence from the remote unit, it assumes that the remote unit is operating in conventional Baudot protocol, and continues all communication using the conventional Baudot protocol.

Machine Control Commands

The enhanced TDD protocol described above makes use of the larger 7 bit character set. Unlike the smaller 32 character Baudot character set, the 7 bit ASCII and CCITT character sets of 128 characters include both upper and lower cases as well as a full set of punctuation characters, and also includes the capability to include control characters. This permits the enhanced TDD to operate with control codes not presently available in conventional Baudot communications. Such control codes may be used to facilitate machine-to-machine communication along the same telephone lines used for communication between the users of the TDD devices, but in a manner invisible to the users of the TDD terminals.

Of particular interest, and with relevance to the present invention, are machine-to-machine commands for controlling and sending information to a TET relay station. In particular, the TET device, utilizing machine control commands transparent to the user, can configure the relay to a method of communication which is suited to the type of call that the originating station wishes to make, i.e. to set itself up for TET communications. The type of set ups will be described below after the method of implementing machine control commands is described first.

A preferred system for machine control commands begins through the use of special synchronization sequence which is similar to the O-synch and A-synch, as described above. The special synchronization sequence, indicating a machine command is to follow, is here termed the [REQ] (request) sequence. The purpose of the REQ sequence is to indicate that machine command codes follow but to avoid requiring the user to wait while a lengthy character set is transmitted to initiate machine-to-machine communication. A form of [REQ] signal is indicated at 78 in FIG. 6.

The protocol for machine-to-machine messages under the enhanced TDD protocol follows the following format:

[REQ][CATEGORY][FUNCTION][ERQ]

In a command of the format described above, [REQ] is the synchronization signal described above which is defined to be a non-printing character which is detectable by both the originating and receiving machines operating under the enhanced TDD protocol. The characters should be selected so as to be non-printing and non-recognizable on a conventional Baudot TDD device.

As illustrated in FIG. 6, the [REQ] sequence begins with an echo suppression pulse "EST" for 35 milliseconds to unlock the receiving phase locked loops. This is followed by three 18 milliseconds mark tones and two 24 milliseconds mark tones, each separated by twelve milliseconds of echo suppression tones. The pattern is terminated with a 35 millisecond echo suppression pulse. The [REQ] sequence is distinguishable from the A-SYNCH sequence by the length of the final two mark tones.

The [REQ] sequence is not an ASCII character, both because it does not conform to the format of an ASCII character with start and stop bits flanking a sequence of marks and spaces, and because it is not one of the character codes obtainable with the ASCII word length. It follows, generally, that the [REQ] sequence may not be initiated by the TDD user by pressing the keys on the keyboard. For this reason, the [REQ] sequence is particularly well suited for applications, such as initiating the "downloading" of emergency information by an emergency service, which should be reserved to particular users, such as legitimate emergency services.

The [REQ] sequence is followed by a [CATEGORY] character which is a 7 bit binary number limited to 16 numbers from hexadecimal 10H (16) to 1FH (31). These are nonprinting characters under the ASCII character set and thus provide a degree of error correction without risk of printing on the TDD. If the character following the [REQ] sequence is not within the 10H to 1FH range then the machine-to-machine communication procedure is aborted before it causes a response or changes operation of the TDD.

In the preferred embodiment, [CATEGORY] 10H is reserved for general machine-to-machine communication between TDDs, whereas [CATEGORY] 11H is used for automatic machine-to-machine communication for emergency services. [CATEGORY] 12H is used for machine-to-machine communication for TDD or TET relay functions.

The next character of the machine-to-machine message format is a [FUNCTION] character which may be any 7 bit number. The value of the [FUNCTION] character is interpreted in light of the [CATEGORY] character previously transmitted. If the [CATEGORY] character is 11H (emergency services), then a [FUNCTION] of 01H instructs the originating TDD to transmit caller information in a block format as will be described below. The pseudo-duplex capabilities of the enhanced TDD protocol eliminates the possibility that this block of information will be inadvertently interrupted and garbled by transmissions by either party. If the [CATEGORY] value is 12H (relay services), [FUNCTIONS] 01H to 06H may be obtained as provided in Table I.

TABLE I

| | |
|---|---|
| 01H | Number to dial |
| 02H | Carrier of choice |
| 03H | Relay user ID |
| 05H | VCO on |
| 06H | VCO off |
| 07H | TET on |
| 07H | TED off |
| 09H | Transmit relay information block |

"Number to dial" is the number of the other party of the conversation, which in this manner may be received and dialed automatically by the relay without operator intervention to eliminate the possibility of error in dialing, to speed the dialing process, and to enhance the privacy of the communication.

[FUNCTION] 03H, the relay user ID is a personal identification number that may be requested of the originating caller to check for authorization of a particular user to use the relay whereas [FUNCTION] 04H and [FUNCTION] 05H: "VCO On" and "VCO Off" control a TDD voice bridge as described above.

For TET relay use, two machine commands may be used. The first might be a [FUNCTION] 01H, directing the relay to dial a remote hearing user to initiate communications. The second might be a [FUNCTION] 06H, telling the relay to set up for a TET configuration, such as is shown in FIG. 5.

The final portion of the machine-to-machine message format is an [ERQ] (end of request) character which is a standard ASCII character 04H. The termination of the machine command by the [ERQ] character is used to allow the TDD software to respond to machine-to-machine requests at variable lengths. For example, the response to a request for emergency service caller information could be any length from zero (no data) to tens of characters. The initiating TDD would collect the characters until an [ERQ] character was received. The format for a response to a machine-to-machine request is simply

[REQ][RESPONSE][ERQ]

where [RESPONSE] is the responding data.

Thus these command functions, and the use of the enhanced TDD protocol enable both the TET device and the relay to automatically properly set up a call for the user. The enhanced TDD protocol devices are capable of understanding their respective roles in the TET relay system and acting accordingly. Thus, for example, the TDD 44 of the call assistant may receive command codes from the TET appliance of the TET user instructing it to dial another party and automatically engage the relay in a TET configuration.

Other command characters could select other parameters of TET relay function. One could be two-directional TET. Another might select voice privacy or a male or female call assistant. Text protocols, code selections and similar technical parameters can be selected by these commands. Thus the user education and participation are minimized.

Circuit Details and TET System Variations

Figure 7:
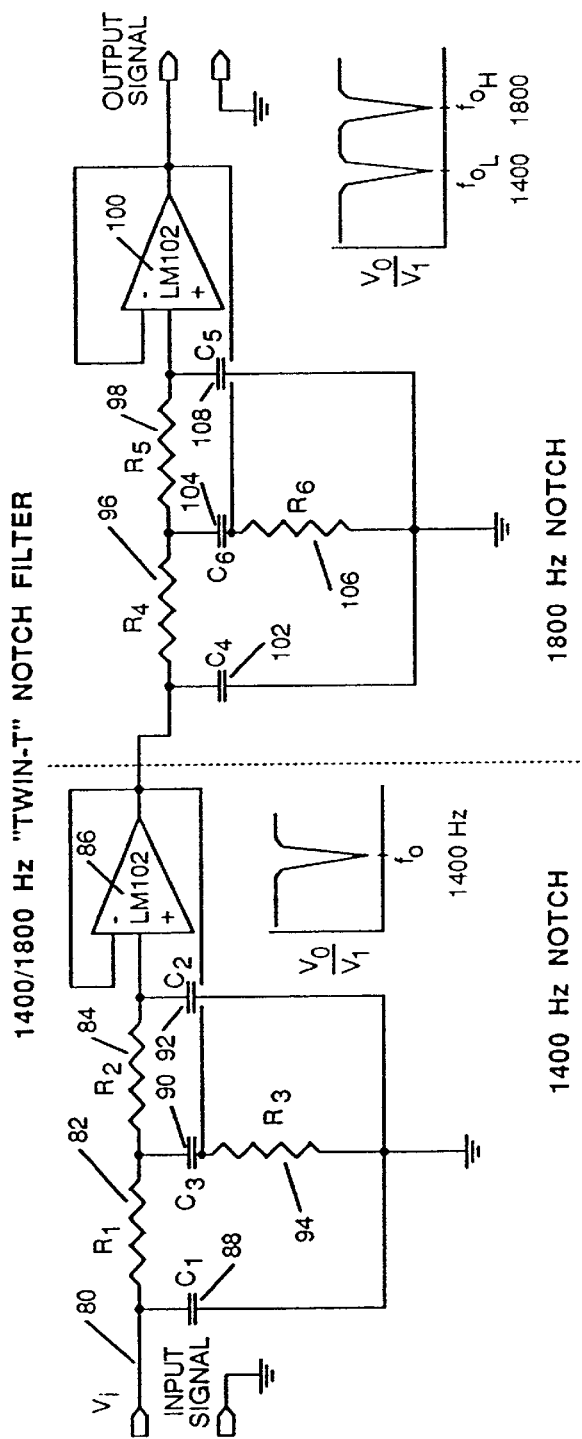
FIG. 7 is a circuit diagram of a notch filter useful in a TET device.
Figure 8:
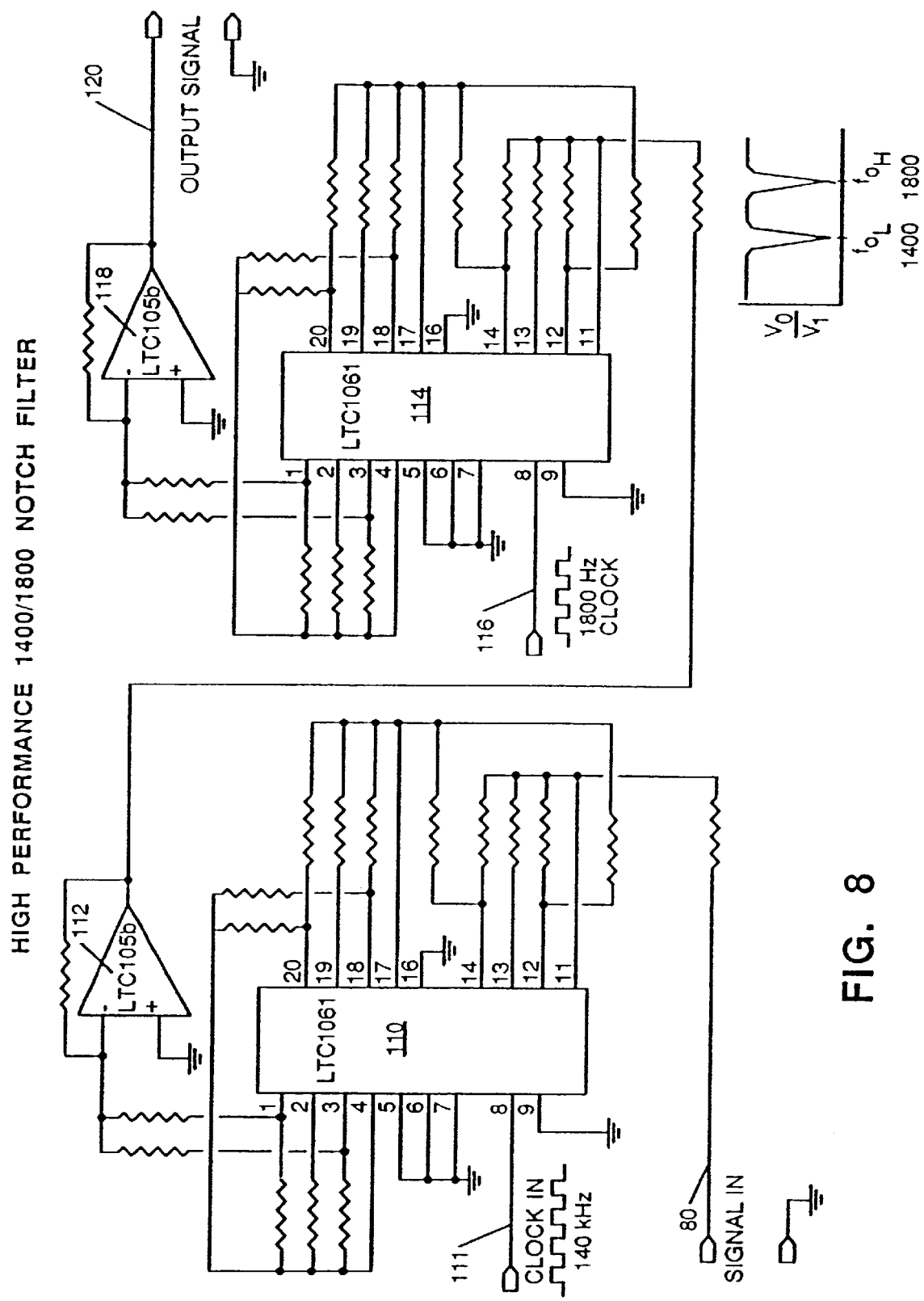
FIG. 8 is a circuit diagram of another embodiment of a notch filter which can be used in a TET device.

Thus, it can be appreciated from the above discussion that the text enhanced telephone system and devices of the present invention differ from prior devices in that the same telephone line is used to carry voice and, at the same time, a digital signal representing a text communication containing the words in text that are being spoken simultaneously by voice. At each end of the telephone line which carries both the text and voice communications, care must be taken to filter the digital communication frequencies from the earpieces of the users and also to filter from the voice signals of each of the users any signals at those text communication frequencies which might otherwise interfere with the text communications. Thus the use of notch filters is important to the present invention. Shown in FIGS. 7 and 8 are two embodiments of exemplary high performance notch filters which may be used within the present invention. Many other designs are, of course, possible as well.

Referring first to FIG. 7, which shows a type of notch filter known in text books as "Twin-T," the input signal 80 is connected through a pair of resistors 82 and 84 to the input of an integrated circuit voltage follower. The input signal 80 is connected through a capacitor 88 to ground and the junction of the resistors 82 and 84 is connected through the series of a capacitor 90 and resistor 94 to ground, with the junction of the capacitor 90 and the resistor 94 also connected to the inverting input of the voltage follower 86. The output of the voltage follower 86 is connected through resistors 96 and 98 to the input of a second integrated circuit voltage follower designated 100. Capacitors 102, 104, 108 and resistor 106 are connected similarly as to the corresponding components associated with the voltage follower 86. The voltage follower may be any of a wide number of integrated circuits designed for this purpose, such as a National Semiconductor LM102. The voltage follower 86 and the voltage follower 100 operate as notch filters, with the frequency of the notch being determined by the appropriate selection of resistors and capacitors associated with each of the integrated circuits. By appropriate choice of resistor and capacitor combinations, it is possible to use the circuit of FIG. 7 to selectively notch filter exactly 1400 and 1800 hertz from a broad band communication signal.

Similarly, shown in FIG. 8, an input signal 80 is connected as one input to a universal dual filter building block integrated circuit 110. The filter building block integrated circuit also receives a clock pulse on input line 111. The frequency of the clock pulse on line 111 determines the frequency at which the integrated circuit 110 performs filtering operations. The output of the integrated circuit 110 is connected through a buffering amplifier 112 to the input of a second universal dual filter building block integrated circuit designated 114 which also is driven by an appropriate clock signal 116. The output of the integrated circuit 114 is connected through a buffer 118 to the output signal 120. If the input line 111 to the integrated circuit 110 is operated at 140,000 hertz and the clock signal 116 to the integrated circuit 114 is operated at 180,000 hertz, the series combination of these two integrated circuits will create a dual notch filter filtering out from the input signal a notch of frequencies centered on 1400 and 1800 hertz respectively. A suitable integrated circuit for use as the building block integrated circuits 110 and 114 is the Linear Technology LTC 106 or other similar integrated circuit.

Among the other ways that text signals can be separated from voice, one other merits particular mention. It is possible to digitize the entire telephone signal incorporating both voice and text signals. Then it is possible to manipulate that digital signal using a digital signal processing (DSP) integrated circuit, of which many are commercially available. Using the DSP, a digital filtering of the tones representing the frequencies of the text communication can be done mathematically with high precision. After processing, the DSP output is again converted to analog form for presentation to the user.

Another variant possible within the present invention, although perhaps a less desirable one, would be to construct a TET circuit, similar to FIG. 1, but without the hybrid circuits. Using a single telephone line, which carries signals both directions, notch filtering would still be necessary to prevent text communications from reaching the ear of the user. This device might also use switching of the telephone line in response to sensed signal type (i.e. local voice versus received voice and text) to prevent input text signals from reaching the user's ear.

Figure 9:
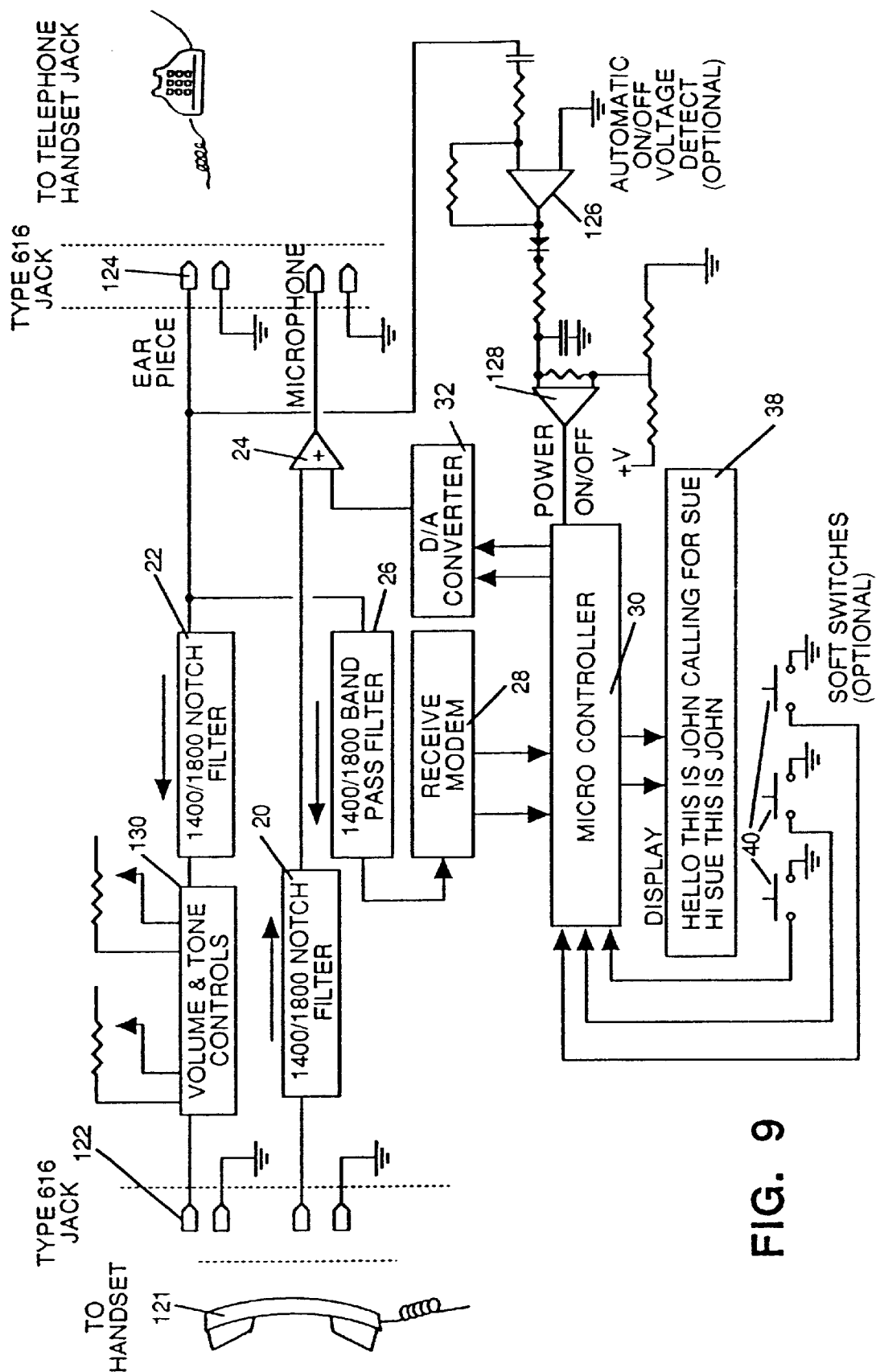
FIG. 9 is a circuit diagram of another embodiment of a TET device.

In FIG. 1 above, it was specifically envisioned that the text enhanced telephone communication appliance was inserted in series in between the telephone base station unit and the wall jack to which the telephone was to be connected. While it is important to the present invention that the TET device be capable of receiving both digital communications and voice communications over the common telephone line, there are several physical configurations in which a TET device can be configured so as to operate with, or replace, the conventional telephone. For example, shown in FIG. 9 is another embodiment. In the embodiment illustrated in FIG. 9, the TET appliance is placed in series between the handset of a conventional telephone and the base unit. The TET of FIG. 9 will not function to intercept and dial on behalf of the user, so dialing of the TET relay must be manually by the user, but other than that difference, the device of FIG. 9 functions in a manner quite similar to the TET device of FIG. 1. In fact, those components in the embodiment of FIG. 9 which are identical in their connection and function to the corresponding components in the embodiment of FIG. 1 have been given identical reference numerals, and will not be described in additional detail herein.

Referring in detail to FIG. 9, the telephone handset 121 is connected through a conventional jack 122. Since the connection between the telephone base unit and the handset is conventionally a four-wire connection, no hybrid circuit is required. The connector or jack at the other end of the device, designated 124, is intended to connect to the telephone base unit 123.

The device of FIG. 9 is particularly intended to function as a receive TET device and to automatically commence operation when digital electronic communications are received over the incoming telephone line. Accordingly, there is an automatic voltage detect circuit created using the operational amplifier 126. This amplifier is constructed so as to detect when a signal of any kind is received over the incoming telephone line to the handset. The output of the operational amplifier 126 is connected to a buffer 128 which serves to turn the power on and off to the microcontroller 30. Connected in series between the notch filter 22, which is placed on the incoming signal line is a volume, and control circuit 130 which allows the volume and the handset to be adjusted according to the user's desires.

Again, the in line TET device of FIG. 9 operates in a fashion exactly analogous to the operation of the TET device of FIG. 1, except that it is placed in between the handset and the base station rather than between the base station and the wall jack of the telephone. This embodiment does not intercept the dialing on behalf of the user, but if the user is willing to dial the relay manually, the circuit of FIG. 9 will satisfactorily and adequately perform text enhanced telephonic communications, prevent digital communications from being heard by user, and display any digital communication signals received so that they can be read by user in exactly the same fashion as the circuit of FIG. 1.

Figure 10:
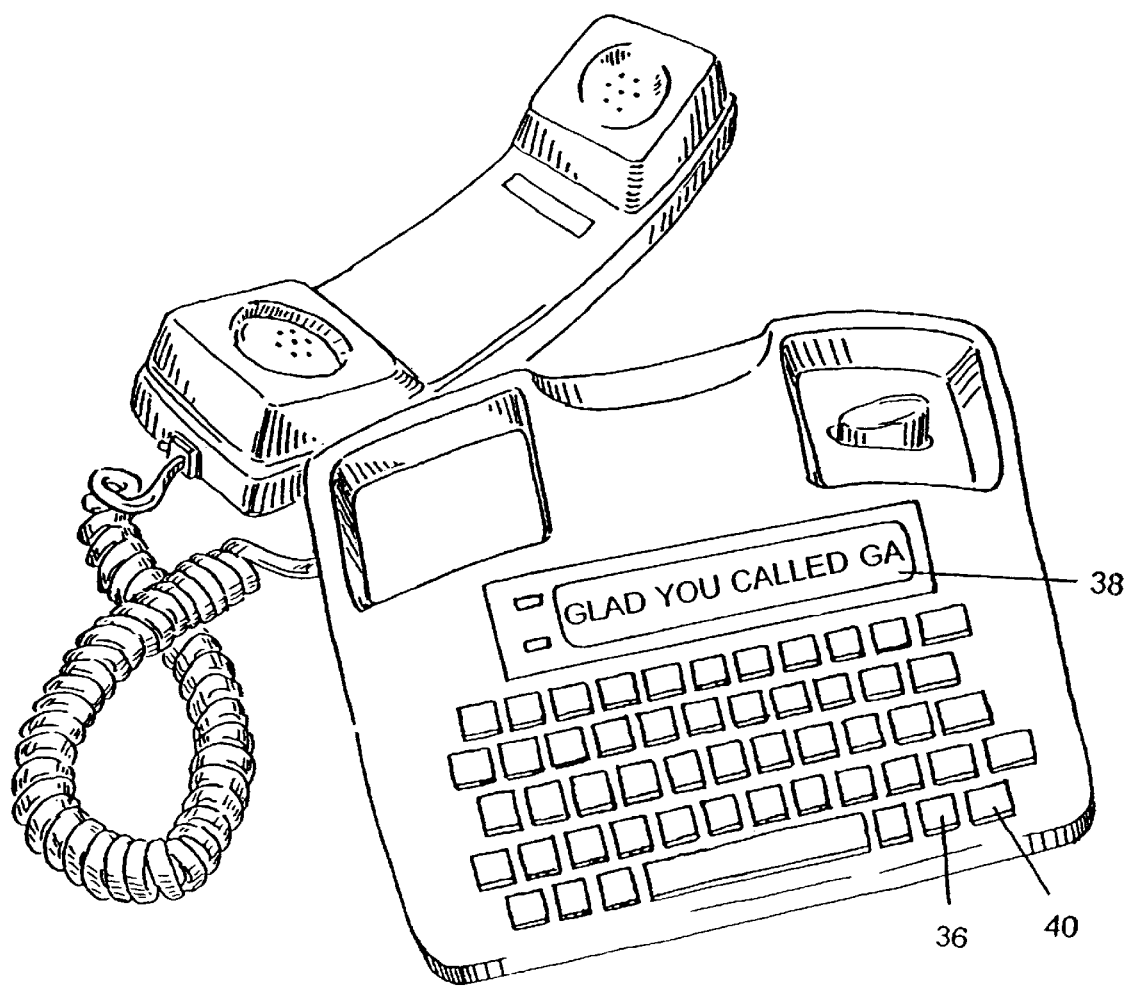
FIG. 10 is an exterior view of another embodiment of a TET device.

It is also specifically envisioned herein that rather than building a separate appliance which is placed between the handset and the base unit or between the base unit and the telephone jack, the circuitry for the TET device can actually be constructed inside the telephone itself in a single unitary appliance. The external appearance of such a device is shown in FIG. 10. This device incorporates the circuitry of FIG. 1 within the housing in which the telephone is manufactured. The only change necessary to the telephone exterior would be the need to provide for a display, so that the digital display 38 can be seen by the users, and the need to provide some place for a few controlling buttons 36 and 40 to turn on and turn off or otherwise select the function of the TET function. However, note that this device also includes a keyboard, connected to the microcontroller, so that it can also be used as a conventional TDD (send as well as receive) by users who need that function as well.

It is preferred, as described above, that the digital communication frequencies of the present invention be the Baudot tones which are used in the enhanced TDD protocol described above. The main reason for desiring the use of these Baudot tones, is that so the devices can be compatible with other TDD and Baudot communicating terminals and relays. However, it is also envisioned herein that rather than using Baudot tones, that the digital communications in accordance with the TET devices of the present invention could actually be conducted in other digital communication protocols, notably the ASCII or CCITT tone protocols conventionally used by digital computers. The only differences in the embodiments described herein which would be required through the use of ASCII or CCITT, rather than Baudot tones, is that the notch filters would have to be constructed so as to filter at the frequencies of the ASCII or CCITT carrier tones, rather than at the 1400 and 1800 hertz signals used by both Baudot and enhanced TDD communication protocols.

It is specifically envisioned that on occasions it may be desirable to connect two, or more, TET users through a TET relay such that both users may obtain the benefits of text enhanced telecommunications. Shown in FIGS. 11 and 12 are two set ups by which that objective can be accomplished.

Figure 11:
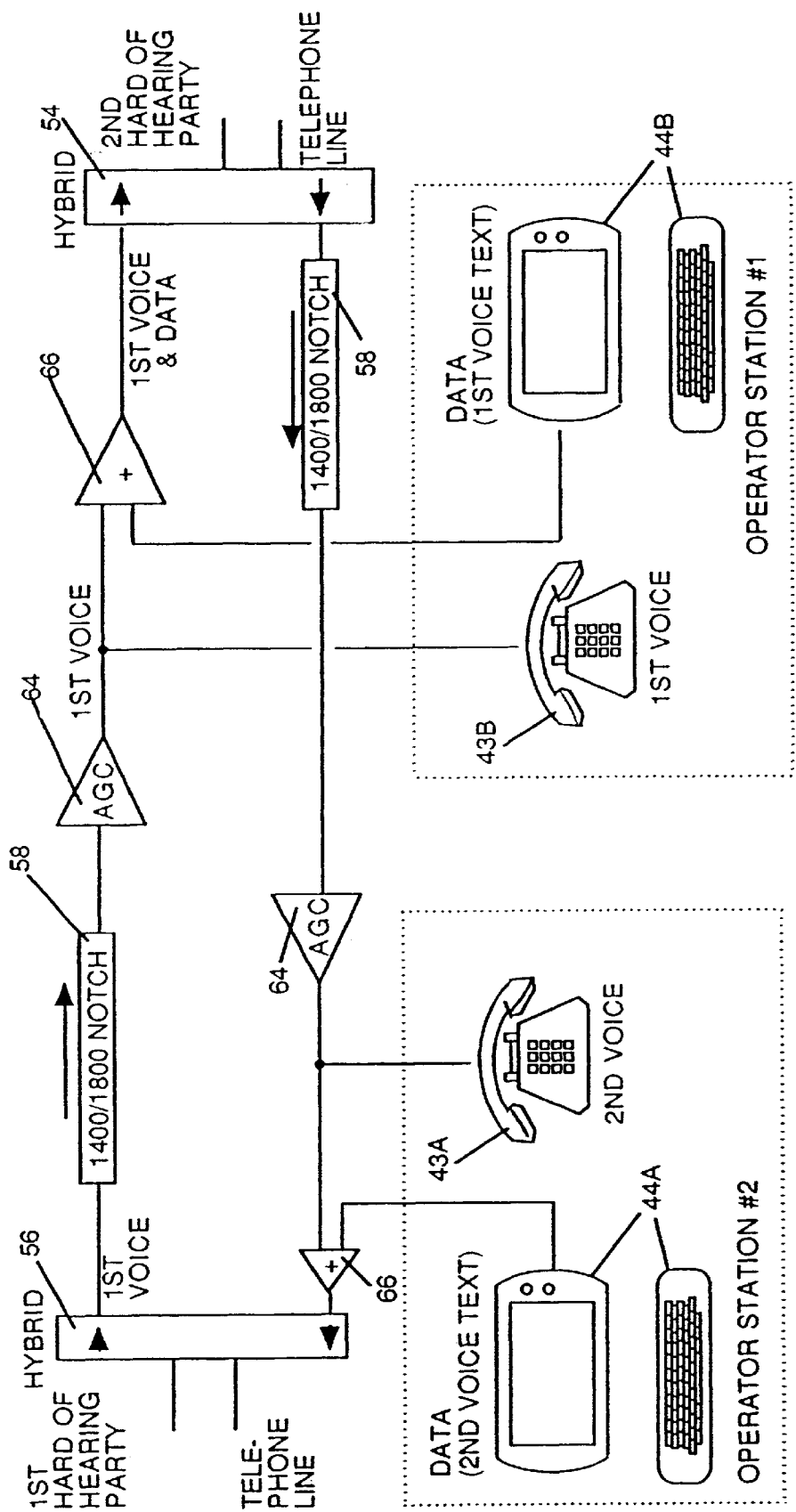
FIG. 11 is a circuit diagram of an alternative relay circuit.

In the system of FIG. 11, in which parts similar to the relay of FIG. 5 have been provided with similar reference numerals, the system is set up to utilize a pair of call assistants, one dedicated to transcribe the voice of each of the two TET users. One of the call assistants utilizes the TDD 44A and the telephone 43A while the other utilizes the TDD 44B and the telephone 43B. Between the hybrids 56 and 54, two oppositely oriented, and identical, circuits are provided analogous to the circuit on one side of the TET relay of FIG. 5. The received telephone signal goes through an AGC amplifier 64 and then through a notch filter 58 to separate out voice components which might interfere with data. The voice is fed to the telephone 43A or 43B for the respective call assistant and also to a summer 66 where it is summed with the output of the respective TDD 44A or 44B. The system is completely symmetrical. Thus, between each hybrid and the respective user, the telephone line carries simultaneously the voice of the other user and a text communication which represents the simultaneous transcription of what is said by the user at the other end of the telephone. The text communications between the two users do not interfere with the voice communications between the users since, on each side of the relay indicated in FIG. 11, the text is only transmitted to the user who desires to see that text and the text and voice are carefully filtered from each other. Again, as far as each user is concerned, they utilize their normal telephone mannerisms and habits. The difference is that as each user talks, the other user sees shortly thereafter a visual indication of the text of what the speaker has spoken on the visual display on his TET appliance.

Figure 12:
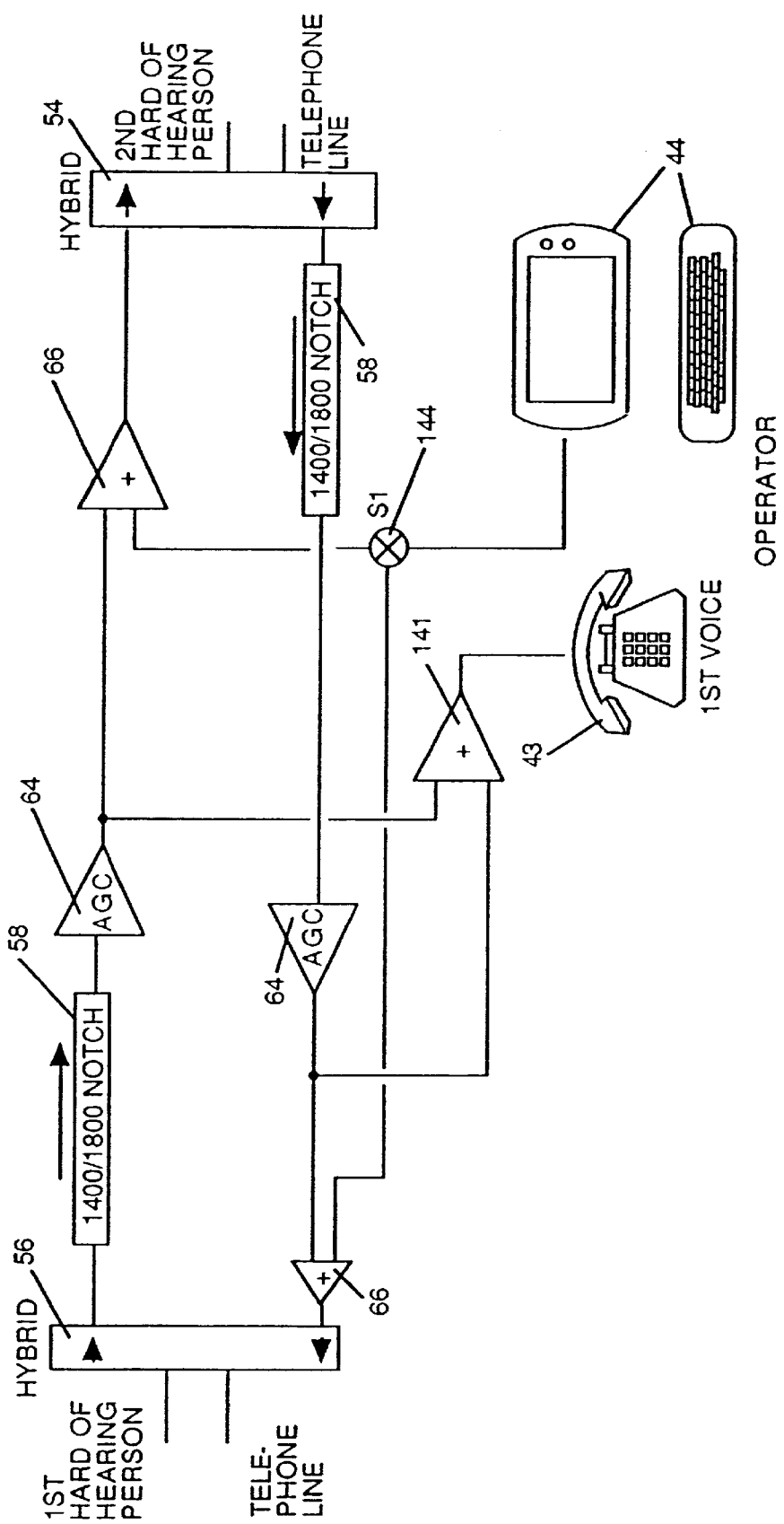
FIG. 12 is a circuit diagram of another alternative relay system.

Shown in FIG. 12 is yet another embodiment illustrating how a two way TET relay could be constructed utilizing a single operator. In this instance, the output of both telephones is connected through a summer 141 to the telephone 43 of the operator. A switch 144 is used either to allow both parties to see the text of either transmissions or, alternately, the switch 144 can be constructed so as to be toggled by the operator so that each party only receives the text version of the words spoken by the opposite party.

It is specifically contemplated herein that technological developments over time will enable the function of the call assistant to be, at some point in the future, an automated function. Once computer assisted voice recognition systems become practical such that they do not require training with a particular voice, the call assistant in any of the relay configurations described above could be replaced by an automated computer. The computer would be programmed simply to translate into text the words spoken by the user and to pass the text to the TET user in a fashion similar to that described above. The only difference is in circuitry would be that the human being representing the call assistant, and that person's telephone and TDD, would be replaced by an automated voice recognition digital electronic system.

It is also envisioned that there may be uses for the TET technology described herein for situations other than the hard of hearing user. For example, such a TET relay system could be utilized for translations where a party understands a foreign language, but only partially. By arranging to have a TET relay operator who was capable of providing a simultaneous translation, a user could arrange to have telephonic communications with a remote user who speaks a language the TET user poorly understands. In that instance, the call assistant would simultaneously translate and type and the TET user could see on his or her display his own native language translation of the words being spoken by the remote user. A TET relay and appliance system may also be desirable in situations where it is desired to record telephonic conversations. It is a simple matter to attach a printer to a TET appliance of the types described above. With such a TET appliance, and utilizing a TET relay as described above, transcriptions of telephone calls could be readily captured and printed in hard copy or stored on a magnetic or other storage medium. This might be particularly useful for conference calls, for business meetings or the like where transcriptions of spoken words are desired. The service could also be used to create transcriptions or text by a single user.

It is to be envisioned that the present invention is not limited to the embodiments described and illustrated herein, but embraces all such modified forms thereof as come within the scope of the following claims.

We claim:

1. A method of providing a text transcription of speech spoken over a telephonic connection between a user and a relay which includes speech to digital text communications conversion capability, the method comprising the steps of providing the user with a communication station that can display digital text visually and that can separate digital text communications from spoken voice transmitted over the telephonic connection;

connecting the station through the telephonic connection to the relay; and at the relay, creating a digital communication text transcription of spoken words and transmitting both the digital communication text transcription and the spoken words simultaneously over the single telephonic connection to the station which displays the text transcription for the user so that the user will receive both the spoken words and the visual display of the text transcription.

* * * * *